March 14, 1961   C. J. CISLO   2,974,675
DUAL HEIGHT LEVELING VALVE FOR AIR SUSPENSION
Filed July 28, 1958
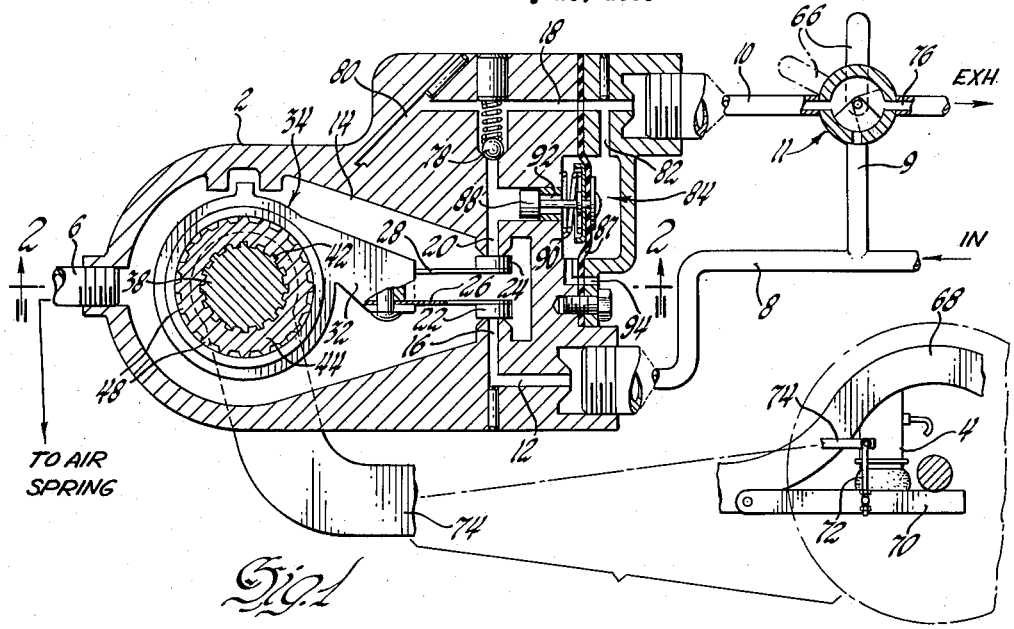
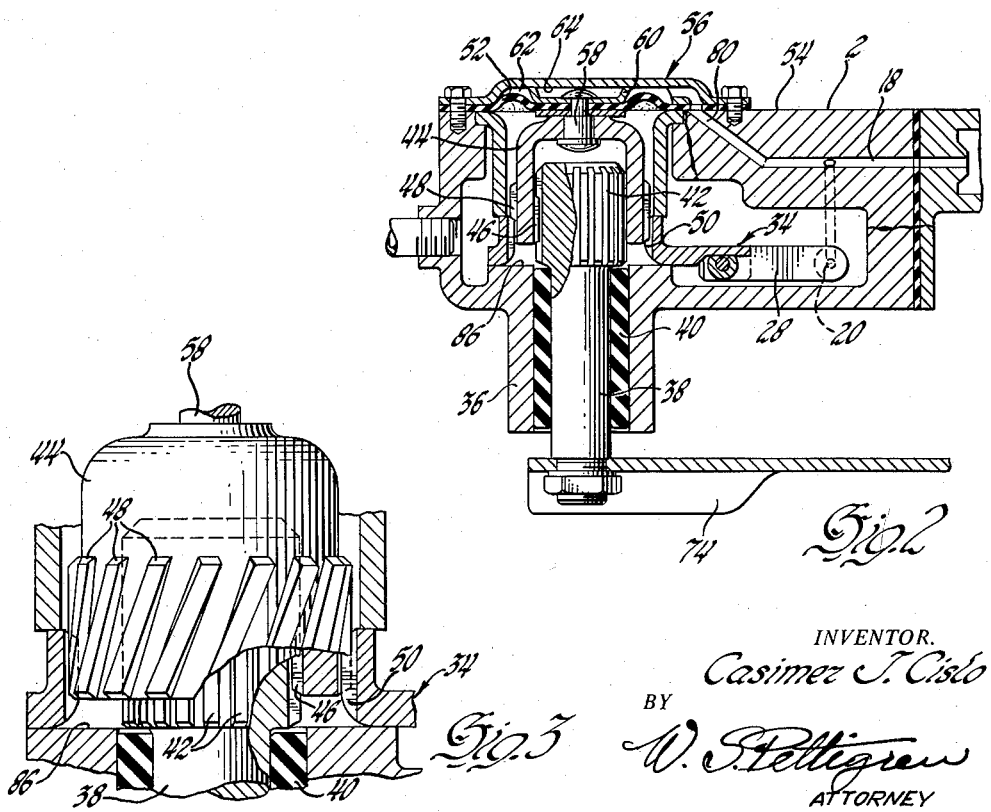
INVENTOR.
Casimer J. Cislo
BY
W. S. Pettigrew
ATTORNEY

United States Patent Office 2,974,675
Patented Mar. 14, 1961

2,974,675
DUAL HEIGHT LEVELING VALVE FOR AIR SUSPENSION

Casimer J. Cislo, Detroit, Mich., assignor to General Motors Corporation, Detroit, Mich., a corporation of Delaware Filed July 28, 1958, Ser. No. 751,277

11 Claims. (Cl. 137—87)

This invention relates to pneumatic suspension for vehicles and more particularly to control apparatus therefor.

The present invention is primarily concerned with the provision of leveling means for pneumatic suspension which leveling means is capable of selective operation to trim or regulate the road clearance of the vehicle at two different vertical levels, one of which provides an extended road clearance for abnormal operating conditions.

An object of the invention is to provide improved control apparatus for fluid suspension.

Another object is to provide an air suspension system incorporating leveling valves which are selectively operable to establish and maintain air springs at two different predetermined levels of displacement.

A further object is to provide a device of the stated character wherein transition from one trim clearance to the other is effected by operation of remotely controlled means.

Still another object is to provide an air suspension system including a leveling valve of the type wherein a rotatable member is linked to an oscillating part of the vehicle suspension in such a way that oscillation of the latter induces angular change of the rotary member which, in turn, alternately opens and closes intake and exhaust valves controlling the flow of air into and out of the air springs, the rotary member including remotely controlled axially displaceable means effective to vary the angular relation between the rotary member and the valve closures so that the trim height of the vehicle is a function of the axial position of the axially displaceable member.

Yet a further object is to provide a valve assembly of the type referred to wherein the axially displaceable member is actuated from its normal position under the influence of high pressure air from the vehicle suspension supply system.

A still further object is to provide apparatus of the stated character wherein high pressure air is routed to the axially displaceable member through the low pressure or exhaust circuit of the valve assembly.

Yet another object is to provide, in a valve of the type described, means providing an alternate circuit for exhausting air from the valve assembly which is operative during the period in which high pressure air is directed through the normal low pressure circuit.

These and other objects, advantages and features of the invention will become more fully apparent as reference is had to the accompanying specification and drawings wherein:

Fig. 1 is a sectional elevational view of an air spring leveling valve assembly, associated parts of the air supply and exhaust circuit, together with relevant mechanical parts of a typical pneumatic suspension arrangement shown in schematic relation thereto;

Fig. 2 is a sectional plan view of the valve assembly looking in the direction of arrows 2—2 of Fig. 1; and Fig. 3 is an enlarged fragmentary view, partly in section, illustrating a portion of the construction incorporated in the invention.

In Fig. 1, the reference numeral 2 designates a substantially hollow valve body which is connected in communicating relation with an air spring assembly 4 by means of a conduit 6. At its opposite side, valve body 2 is connected to an intake or high pressure conduit 8 and a low pressure or exhaust conduit 10, both of which form a part of the vehicle air supply and exhaust system, not shown. Extending between and connecting conduits 8 and 10 is a conduit 9. Disposed in conduit 10 and connected to conduit 9 is a control valve 11 which is operable to a first position preventing cross-flow between conduits 8 and 10 and to a second position allowing air flow, the purpose of which will appear hereinafter.

Formed interiorly of body 2 is an intake passage 12 which communicates with conduit 8. At its other end, passage 12 emerges into a large cavity 14 in body 2 via an orifice 16. An exhaust passage 18 communicates with exhaust conduit 10 and emerges into cavity 14 via an orifice 20 spaced vertically from and axially aligned with orifice 16. To control the flow of air into and out of spring assembly 4 via conduit 6, there is provided a pair of valve closures 22 and 24 which are mounted in oppositely facing relation on the outer ends of spring arms 26 and 28, respectively. Arms 26 and 28 are disposed in parallel relation and are secured at their inner ends to an integral projection 32 formed on a spool-like member 34 which is rotatably supported in cavity 14 of body 2.

As seen best in Fig. 2, one side wall of valve body 2 is provided with a laterally extending sleeve portion 36 in which is rotatably disposed a shaft 38. Shaft 38 comprises a smooth outer portion which is surrounded by a flexible bearing portion 40 and an enlarged inner portion 42 having axially directed straight splines formed thereon. Slidably disposed over the straight splined portion of shaft 38 is a cup-shaped member 44 having splines 46 formed on the inner wall thereof cooperating with spline portion 42. On its outer wall, member 44 is formed with radially projecting helical splines 48 which are arranged in interfitting relation with cooperating inwardly projecting helical splines 50 formed on the inner wall of spool member 34.

Connected to the closed end of cup-shaped member 44 is a flexible diaphragm 52, the outer periphery of which is clamped in sealing engagement between the outer wall 54 of valve body 2 and a protruding cap or cover member 56. The connection between diaphragm 52 and cup-shaped member 44 includes a shouldered rivet 58 and a flanged cup structure 60 which permits free rotation of the cup-shaped member relative to the diaphragm while preventing leakage of air from cavity 14 to the cavity 62 defined by cap structure 56. Flanged cup structure 60 normally engages the end wall 64 of member 56 to thereby establish the normal axial position of cup member 44 with respect to shaft 38.

In order that the invention may be more fully understood, a description of the function of the device and sequence of operation thereof follows. Assume that operating lever 66 of remotely located control valve 11 occupies the position shown in solid lines. Under these conditions, normal air movement occurs, i.e., high pressure air flows through conduit 8 into valve body 2 and exhaust air flows from valve body 2 through exhaust conduit 10 to atmosphere. Under these circumstances, as long as the height clearance between the sprung mass 68 and wheel control arm 70 remain at a predetermined clearance, both valve closures 22 and 24 will be maintained in yielding engagement with orifices 16 and 20, respectively. In consequence, air can neither enter nor leave spring 4. However, any substantial change in the predetermined clearance mentioned will impart rotational movement to spool 34 by virtue of the mechanical operation of yieldable link 72 and operating arm 74 which impart rotational movement to shaft 38 and hence to spool 34. Thus, if the arm 74 is displaced counterclockwise due to insufficient vertical clearance, intake valve closure 22 will be lifted from orifice 16, allowing introduction of additional high pressure air into cavity 14 and thence to air spring 4 via conduit 6. Clockwise movement of operating arm 74 will, of course, cause opposite rotation of spool 34 and hence open exhaust orifice 20 allowing exhaust of air from spring 4. Assume now that the vehicle operator wishes to temporarily increase the normal vertical clearance between sprung mass 68 and wheel control arm 70. Upon movement of operating lever 66 of control valve 11 to the position shown in dotted lines, high pressure conduit 8 is opened to communication with exhaust conduit 10 via conduit 9, while the exhaust exit 76 to atmosphere is simultaneously blocked. Accordingly, high pressure air moves through exhaust conduit 10 into passage 18 of valve body 2. However, because of the closing direction of ball check 78 in part 18, high pressure air is prevented from entering exhaust orifice 20. Therefore, high pressure air flows into alternate passages 80 and 82 which communicate with passage 18.

In Fig. 2, it will be observed that passage 80 communicates with the cavity 62 formed between diaphragm 52 and cap structure 56. As a result, the normal atmospheric pressure therein instantly increases to the level of operating pressure in the high pressure system exerting downward pressure on diaphragm 52, causing cup-shaped member 44 to move axially inwardly on the splined end of rotary shaft 38 until the open end of member 44 engages shoulder 86 of valve body 2. During such axial movement, member 44 maintains a constant angular relationship with shaft 38 due to the straight spline connection therewith, but due to the helical splined connection between member 44 and spool 34, straight axial movement of member 44 imparts a predetermined degree of change in angular relation between cup-shaped member 44 and spool 34. As a result, the normal angular relationship between operating arm 74 and the two parallel spring arms 26 and 28 undergoes a change. Axial inward displacement of cup-shaped member 44 imparts counterclockwise angular movement (as viewed from Fig. 1) to spool 34 relative to arm 74. Hence, even though arm 74 remains stationary with respect to valve body 2, the aforesaid angular movement of spool 34 causes spring arms 24 and 26 to swing upwardly. Such upward movement increases the closing pressure of closure 24 due to bending stress on arm 24 while lifting closure 22 from intake port 16, allowing air to enter the spring until an increase in vehicle trim height has been achieved which re-orients arm 72 to a position causing blades 26 and 28 to resume the normal horizontal centered position shown. According to the invention, after the extended trim height has been achieved, the leveling valve assembly functions to alternately introduce and exhaust air from the springs and maintain the new or extended trim height position. However, inasmuch as the normal exhaust path through exhaust passage 18 is rendered inoperative due to the closed position of check valve 78, exhausting of air takes place through an alternate path. As seen best in Fig. 1, alternate passage 82, previously referred to, communicates with a cavity 84 which is partitioned by a diaphragm 87 which has operatively connected thereto a spring biased check valve assembly 88. Under normal conditions (in the absence of high pressure air in the right side of cavity 84), spring 90 maintains the check valve 88 in seated position closing orifice 92. However, when high pressure air enters cavity 84, seating pressure of spring 90 is overcome, causing valve 88 to be displaced thereby providing an alternate path for flow of exhaust air from orifice 20 into the left side of cavity 84 and thence to atmosphere through port 94.

When the operator wishes to restore normal vehicle road clearance, control valve 11 is returned to its normal position causing the pressure in cavities 62 and 84 to return to atmospheric pressure. As a result, the normal relatively high internal pressure in cavity 14 acting on diaphragm 52 urges spool member 44 axially outwardly until member 60 engages wall 64 of cap 56, thereby returning the spool to the axial position shown in Fig. 2 and by virtue of the helical connection, restoring the normal angular relation between arm 72 and spring arms 26 and 28. This latter movement results in clockwise rotation of arms 26 and 28 thereby unseating exhaust closure 24 from orifice 20. Since the pressure in the passage is now atmospheric pressure check valve 78 is displaced by air from cavity 14 which passes to atmosphere through exhaust exit 76 of conduit 10 until reduction in vehicle clearance returns closure 24 to closed position.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A dual height leveling valve comprising a housing having a main cavity, an intake passage and an exhaust passage opening into said cavity, closure means for said passages, a shaft rotatably mounted in said housing, an actuating arm rotatable with said shaft to displace said intake and exhaust closures respectively upon movement of said shaft in opposite directions from a predetermined neutral position, and means axially movable in said shaft for altering the angular relation of said arm with respect to said shaft.

2. A dual height leveling valve comprising a housing having a main cavity, an intake passage and an exhaust passage opening into said cavity, closure means for said passages, a shaft rotatably mounted in said housing, an actuating arm rotatable with said shaft to displace said intake and exhaust closures respectively upon movement of said shaft in opposite directions from a predetermined neutral position, and a splined connection disposed between said shaft and arm, said splined connection being formed and arranged so that axial movement thereof alters the angular relation of said arm with respect to said shaft.

3. A dual height leveling valve comprising a housing having a main cavity, an intake passage and an exhaust passage opening into said cavity, closure means for said passages, a shaft rotatably mounted in said housing, an actuating arm rotatable with said shaft to displace said intake and exhaust closures respectively upon movement of said shaft in opposite directions from a predetermined neutral position, and a fluid pressure actuated axially movable splined connection between said shaft and arm, said splined connection including a helix portion which alters the angular relation of said arm with respect to said shaft upon movement of said connection.

4. A dual height leveling valve comprising a housing having a main cavity, an intake passage and an exhaust passage communicating with said cavity, closure means for said passages, a shaft rotatably mounted in said housing, an actuating arm operatively connected to said shaft so as to move angularly therewith to displace said intake and exhaust closures respectively upon movement of said shaft in opposite directions, and axially movable means interconnecting said shaft and arm, said means including a helical connection adapted to alter the angular relation of said arm with respect to said shaft upon axial movement of said interconnecting means, so that said displacement of said closures occurs upon movement of said shaft in opposite directions from a first and a second predetermined neutral position.

5. A dual height leveling valve comprising a housing having a main cavity, an intake passage and an exhaust passage opening into said cavity, closure means for said passages, a driven shaft rotatably mounted in said housing, an actuating arm rotatable with said shaft to displace said intake and exhaust closure, respectively, upon movement of said shaft in opposite directions from a predetermined neutral position, an axially movable member disposed between said shaft and arm, fluid pressure means for moving said member to either of two defined axial positions, and means associated with said member effective to change the angular relation of said shaft and closure means upon said axial movement.

6. A dual height leveling valve comprising a housing having a main cavity, an intake passage, an exhaust passage, closure means for said passages, a shaft rotatably mounted in said housing, an actuating arm operatively connected to said shaft and adapted to displace said intake and exhaust closures, respectively, upon movement of said shaft in opposite directions from a predetermined neutral position, the operative connection comprising a splined helix disposed between and slidable axially of said shaft and arm, and means for moving said splined helix axially to alter the angular relation of said arm with respect to said shaft.

7. A dual height leveling valve for pneumatic vehicle suspension comprising a housing having a main cavity, a fluid intake and a fluid exhaust passage opening into said cavity, closure means movable in opposite directions from a central position to open and close said intake and exhaust passages respectively, a driven rotatable shaft, means operatively connecting said shaft and said closure means for concurrent angular movement, said means including a helically splined member effective upon axial movement to establish a first and a second angular relation between said shaft and said closure means and to maintain the same during said concurrent movement, a fluid pressure device for axially displacing said member, and means associated with one of said passages for directing fluid into said device.

8. A dual height leveling valve for pneumatic vehicle suspension comprising a housing having a main cavity, a fluid intake and a fluid exhaust passage opening into said cavity, closure means movable in opposite directions from a central position to open and close said intake and exhaust passages respectively, a driven rotatable shaft, means operatively connecting said shaft and said closure means for concurrent angular movement, said means including an axially movable helically splined member effective to establish a first and a second angular relation between said shaft and closure means and to maintain the same during said concurrent movement, a fluid pressure responsive device for axially displacing said member, and passage means associated with said exhaust passage for introducing fluid into said device.

9. A dual height leveling valve for pneumatic vehicle suspension comprising a housing having a main cavity, a fluid intake and a fluid exhaust passage, each having a port opening into said cavity, closure means movable in opposite directions from a central position to open and close said intake and exhaust ports respectively, a driven rotatable shaft, closure operating means surrounding said shaft, means operatively connecting said shaft and said operating means for concurrent angular movement, said means including an axially movable member having straight splines engaging said shaft and helical splines engaging said operating means, said member being effective upon axial movement thereof to establish a first and a second angular relation between said shaft and closure and to maintain the same during said concurrent movement, a fluid pressure responsive device for axially displacing said member, means connecting said device in fluid communication with said exhaust passage, and means for introducing fluid under pressure into said exhaust passage.

10. A dual height leveling valve for pneumatic vehicle suspension comprising a housing having a main cavity, a fluid intake and a fluid exhaust passage having opposed ports opening into said cavity, closure means, closure operating means movable in opposite directions from a central position to open and close said intake and exhaust ports respectively, a driven rotatable shaft, means operatively connecting said shaft and said closure operating means for concurrent angular movement, said means including a helically splined member effective upon axial movement to establish a first and a second angular relation between said shaft and closure operating means and to maintain the same during said concurrent movement, a fluid pressure responsive device arranged so that pressure in said main cavity acts on one side thereof to axially displace said member in one direction, means associated with said exhaust passage for introducing fluid on the other side of said device to displace said member in the opposite direction, means for introducing fluid under pressure into said exhaust passage, means responsive to introduction of fluid under pressure into said exhaust passage for blocking flow from said exhaust passage to said main cavity, and means providing an alternate exhaust flow path upon introduction of fluid under pressure into said exhaust passage.

11. A dual height leveling valve assembly for pneumatic vehicle suspension of the type having an intake and an exhaust circuit adapted for selective connection in direct communicating relation, said assembly comprising a housing having a main cavity and a secondary cavity, a diaphragm partitioning said cavities, a driven rotatable shaft mounted in said main cavity, a fluid intake and a fluid exhaust port opening into said cavity, closure means movable in opposite directions from a central position to open and close said intake and exhaust ports respectively, closure operating means journaled in said main cavity and surrounding said shaft, an axially movable cup-shaped member secured to said diaphragm and disposed between said shaft and said operating means, a straight spline connection between said member and said shaft, a helical spline connection between said member and said operating means, said diaphragm acting in one direction responsive to fluid pressure in said main cavity to move and maintain said cup-shaped member in a first axial position establishing a first angular relation between said shaft and said operating means, passage means connecting said exhaust passage with said secondary cavity, said diaphragm acting in the opposite direction responsive to fluid pressure in said secondary cavity to move and maintain said cup-shaped member in a second axial position establishing a second angular relation between said shaft and said opposite means, a check valve in said exhaust passage blocking flow therefrom to said main cavity, and means actuated by pressure in said exhaust passage providing an outlet to atmosphere from the portion of said exhaust passage between said closure and said check valve.

References Cited in the file of this patent

UNITED STATES PATENTS

| | | |
|---|---|---|
| 1,916,384 | Newberg | July 4, 1933 |
| 2,670,201 | Rossman | Feb. 23, 1954 |
| 2,787,475 | Jackson | Apr. 2, 1957 |
| 2,844,385 | Pribonic | July 22, 1958 |